R. A. SUMMERS.
MUD GUARD FOR AUTOMOBILES.
APPLICATION FILED APR. 17, 1916.
1,206,166.
Patented Nov. 28, 1916.
2 SHEETS—SHEET 1.
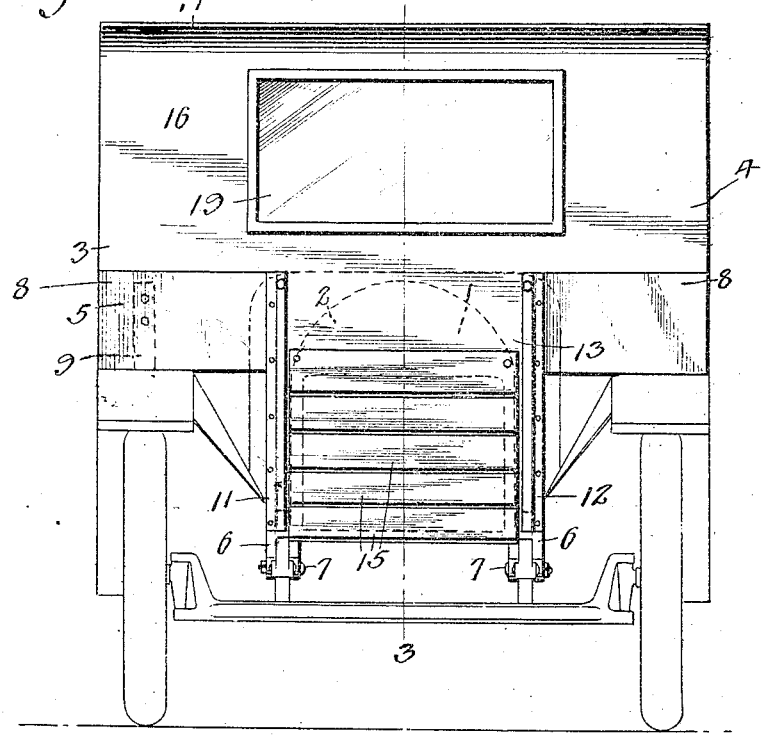
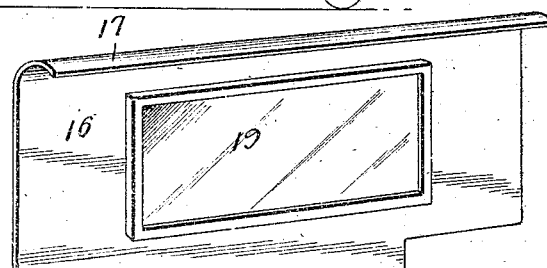
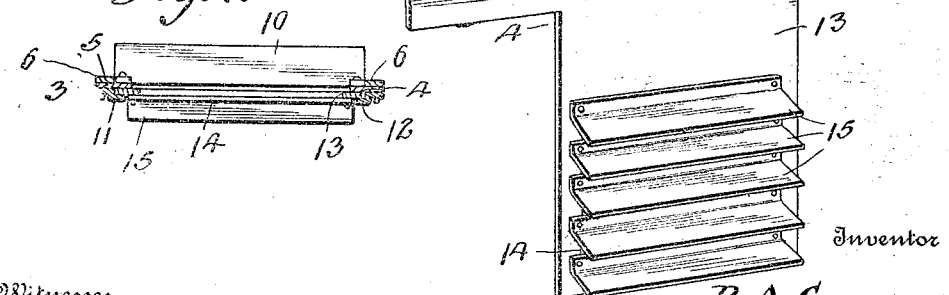
Witnesses
Inventor
R. A. Summers,
By Victor J. Evans
Attorney

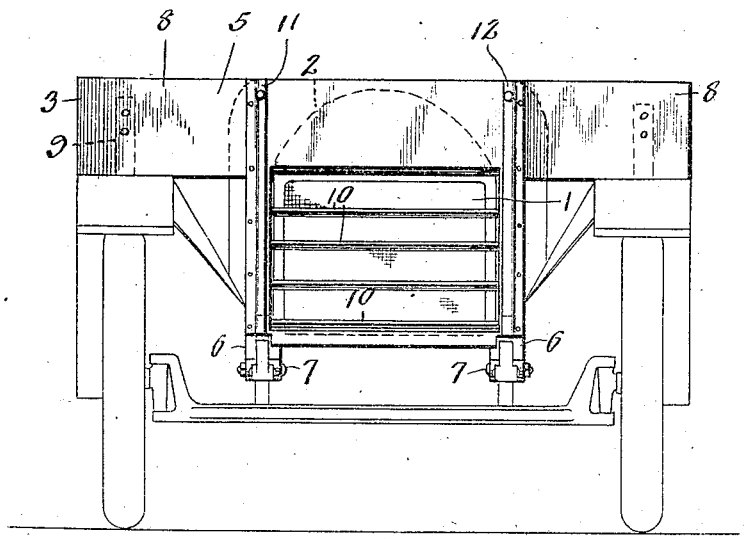
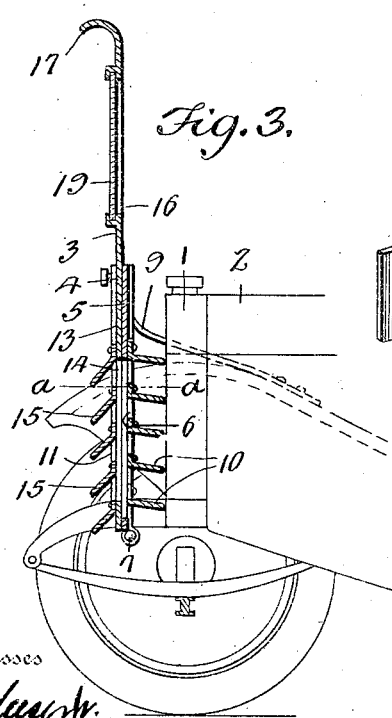
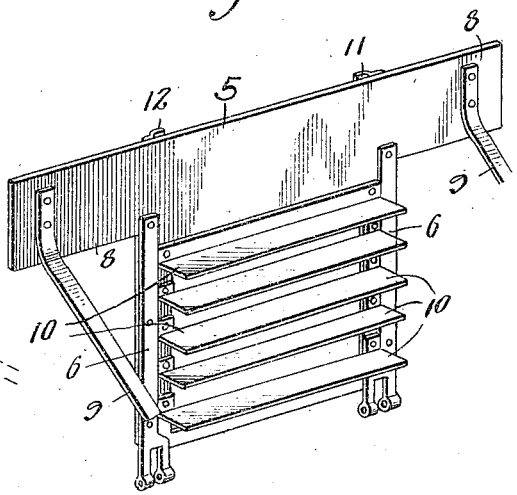

UNITED STATES PATENT OFFICE.

ROBERT ALPHONSIS SUMMERS, OF LEMONCOVE, CALIFORNIA.

MUD-GUARD FOR AUTOMOBILES.

1,206,166.   Specification of Letters Patent.   Patented Nov. 28, 1916.

Application filed April 17, 1916.   Serial No. 91,669.

*To all whom it may concern:*

Be it known that I, ROBERT A. SUMMERS, a citizen of the United States, residing at Lemoncove, in the county of Tulare and State of California, have invented new and useful Improvements in Mud-Guards for Automobiles, of which the following is a specification.

This invention relates to a shield or guard for the front of automobiles or other vehicles and is primarily designed to protect the radiator as well as the engine hood of an automobile from being coated with mud, and thus prevent the clogging of the radiator.

Another object of the invention is to provide a device of this class which may be easily and quickly attached to the front of any ordinary construction of automobiles and which includes a slidable upper member which may be removed when not in use.

With the above and other objects in view, the improvement resides in the construction, combination and arrangement of parts set forth in the following specification and falling within the scope of the appended claims.

In the drawings: Figure 1 is an elevation of the front portion of an automobile provided with my improvement, Fig. 2 is a similar view with the upper member of the mud guard or shield removed, Fig. 3 is a central vertical longitudinal sectional view taken through the device as shown in Fig. 1, Fig. 4 is a transverse sectional view approximately on the line *a—a* of Fig. 3, Fig. 5 is a perspective view of the lower member or guard looking toward the inner face thereof, and Fig. 6 is a perspective view of the upper member of the guard.

In the drawings the numeral 1 designates the front of the radiator of an ordinary automobile, and 2 the hood inclosing the radiator and engine.

The numeral 3 designates, broadly, my improvement. This improvement comprises an upper removable member 4 and a lower member 5 which is adapted to be attached to the front of the automobile and if desired to remain a permanent fixture therewith. The member 5 comprises a substantially rectangular element having its sides formed with depending plates 6, which are slotted so that securing elements 7 may have their shanks passed through the said slots and received in the front of the frame or chassis of the automobile. The member 5 has its top provided with lateral extensions 8, and connected with each of the said extensions is an angularly disposed brace rod 9 which has its free end either secured upon the front wheel guards of the machine or connected to the said machine in any desired or preferred manner. The substantially rectangular member 5 is provided with a central substantially rectangular opening that is disposed forward of the radiator and formed with the said member and arranged transversely thereof so as to straddle the opening, is a plurality of spaced deflector plates 10 which are adapted to direct the currents of air through the radiator. The member 5 is provided with vertically disposed U-shaped guide flanges 11 and 12, to receive the edges of the central and depending portion 13 of the upper member 4 of the guard. This depending portion or tongue 13 is provided with a plurality of spaced transversely arranged openings 14, and is further provided with downwardly extending angularly disposed shield plates 15, one for each of the openings 14. These plates 15 are disposed to prevent mud and dirt from entering the radiator, but at the same time do not interfere with the free passage of air through the openings 14 and through the open front of the member 5, the said currents of air being directed by the deflector plates 10 through the radiator as will, it is thought, be readily understood. The upper portion of the member 4, indicated for distinction, by the numeral 16 is of a width equaling that of the upper portion of the member 5, and is rounded outwardly, at its upper edge, as indicated by the numeral 17. This portion 16 is centrally provided with an enlarged elongated opening which is closed by a transparent plate 19, and this plate is so arranged that the operator of the machine may have a free observation of the roadway. The rounded portion 17 of the member 4 serves as a protector for the transparent plate 19.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

1. The combination with an automobile, of a guard comprising a flat substantially rectangular member secured to the front of the automobile disposed outward of the radiator and engine hood thereof, and projecting above the said hood, said guard having openings arranged to communicate with the radiator.

2. The combination with an automobile or the like, of a guard secured to the front thereof forward of the radiator and projecting above the radiator, said guard having openings arranged in a line with the radiator, and shield plates for the said openings.

3. The combination with an automobile, of a guard secured to the automobile forward of the radiator and projecting above the radiator, slotted straps depending from the guard, securing elements passing through the straps and entering the chassis or frame of the automobile, angular brace rods connecting the guard with the automobile, said guard having openings to aline with the radiator, and a shield plate for each of the openings.

4. The combination with an automobile, of a flat substantially rectangular member comprising a guard secured to the front of the automobile, forward of the radiator thereof and projecting above the radiator, said guard having openings therein arranged opposite the radiator of the automobile, angularly disposed shield plates for the openings and deflector plates arranged to the rear of the shield plates.

5. The combination with an automobile, of a guard secured to the front of the automobile, outward of the radiator thereof and projecting above the said radiator, said guard comprising a substantially rectangular member having openings therein which are arranged forward of the radiator, downwardly disposed deflecting plates for the openings, an elongated opening in the upper portion of the guard, and a transparent plate closing the said opening.

6. The combination with an automobile, of a mud guard comprising a substantially flat rectangular member having its lower portion secured to the front of the automobile forward of the radiator for the engine of the said automobile, having an upper portion wider than the lower portion thereof, said lower portion being provided with openings, angularly disposed shield plates for each of the openings, an inwardly disposed deflecting plate for each of the openings, the widened upper portion of the said guard having an elongated opening, a transparent plate closing the opening, and the upper edge of the said guard being rounded outwardly to provide a shield for the plate.

7. The combination with an automobile, of a guard secured to the automobile forward of the radiator from the engine thereof, said guard comprising an upper and a lower section, said lower section being secured to the automobile, and the upper section being slidable upon the lower section, the lower section having an opening and being provided with transverse horizontally disposed plates straddling the opening, the upper section having its lower portion provided with a plurality of openings communicating with the opening in the lower section, and a downwardly arranged angularly disposed shield plate for each of the said openings.

8. In a mud guard for the radiator of an automobile, the combination of a lower section which is secured to the automobile forward of the radiator for the engine thereof, and an upper section which is slidable upon the lower section, said lower section having its portion forward of the radiator formed with an opening, horizontal plates arranged upon the rear of the said section and straddling the opening, the portion of the said section above the opening being wider than the lower portion thereof, vertically disposed guide members at the opposite sides of the opening, the upper section having a central reduced portion received in the guides, said reduced portion being provided with a plurality of openings, an angularly disposed shield plate for each of the openings, said upper section having its upper edge rounded and being provided below its said edge with an elongated opening, and a transparent plate closing the said opening.

In testimony whereof I affix my signature in presence of two witnesses.

ROBERT ALPHONSIS SUMMERS.

Witnesses:
R. H. McGee,
J. A. Moffet.